Aug. 21, 1934.  J. W. BISHOP  1,970,685
VALVE CONTROL FOR PRESSES
Original Filed Jan. 27, 1928  4 Sheets-Sheet 3
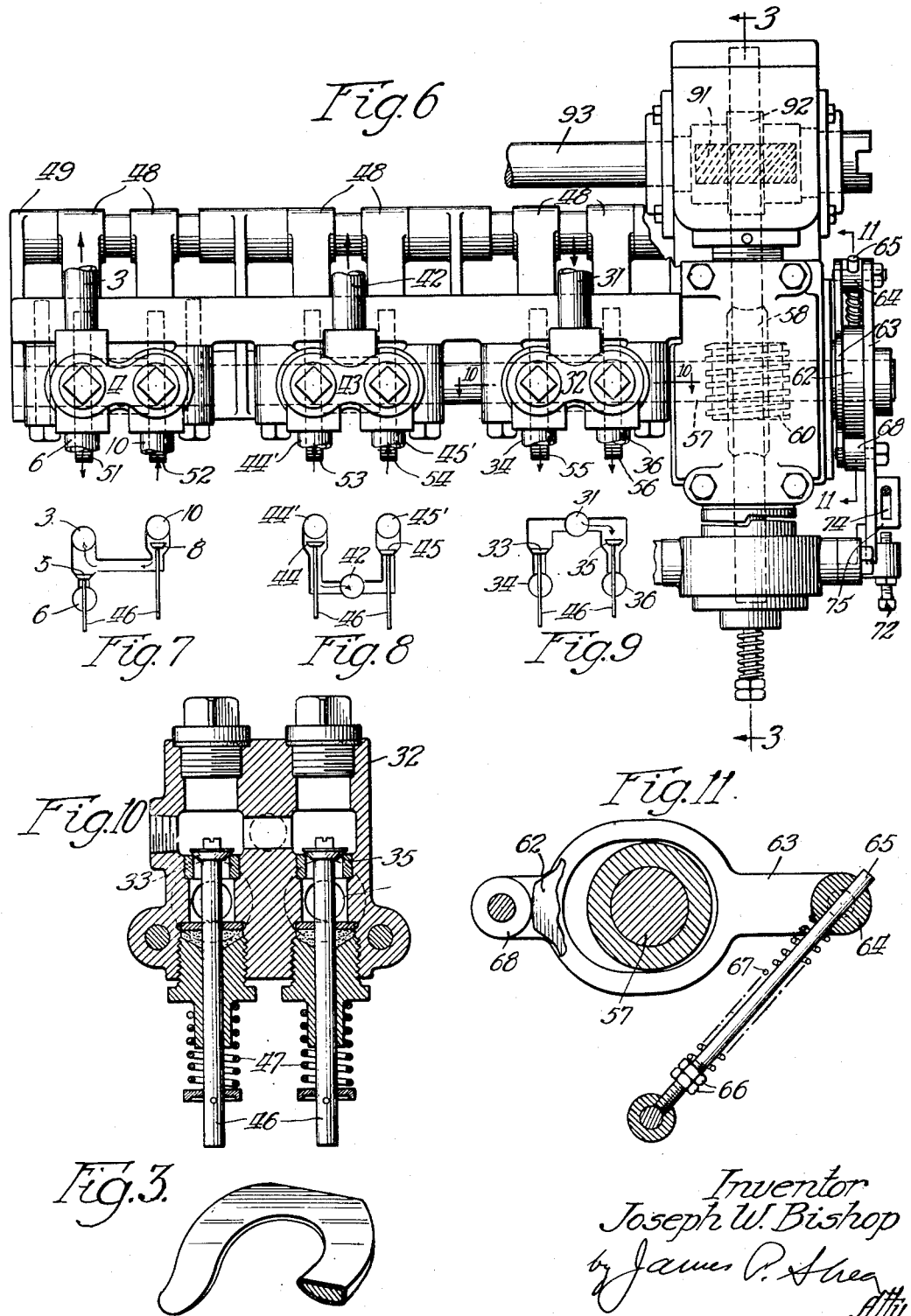
Inventor
Joseph W. Bishop

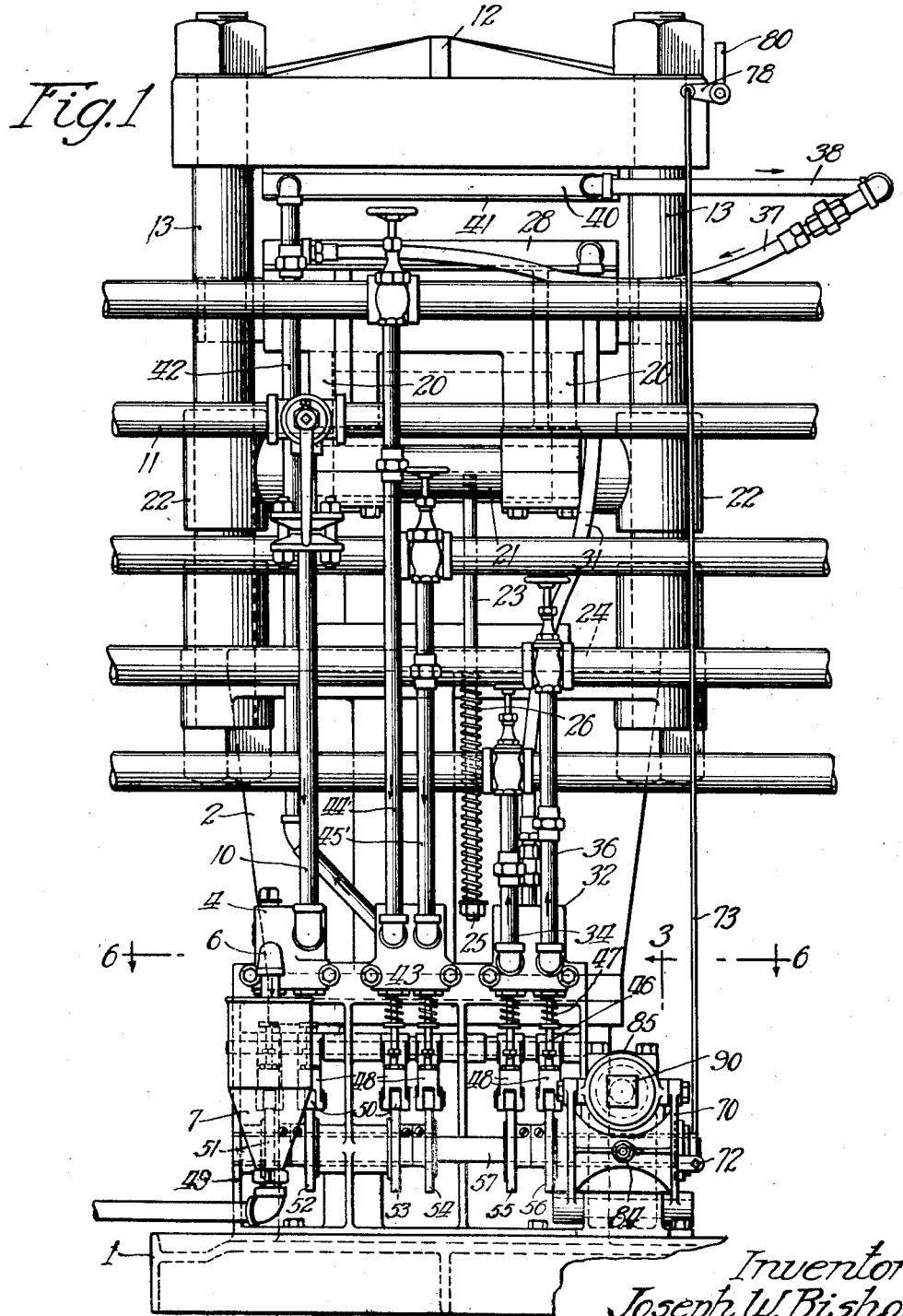

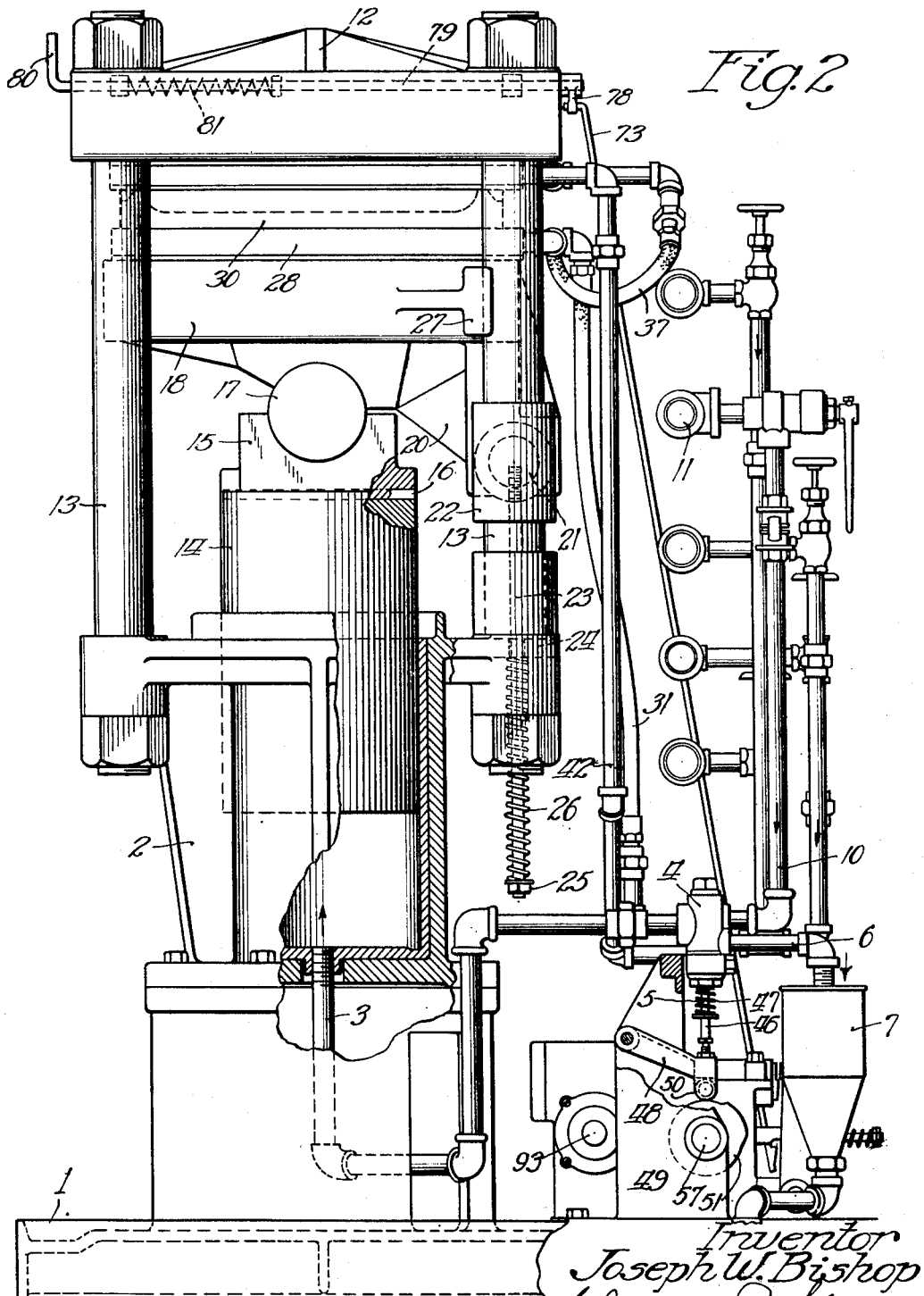

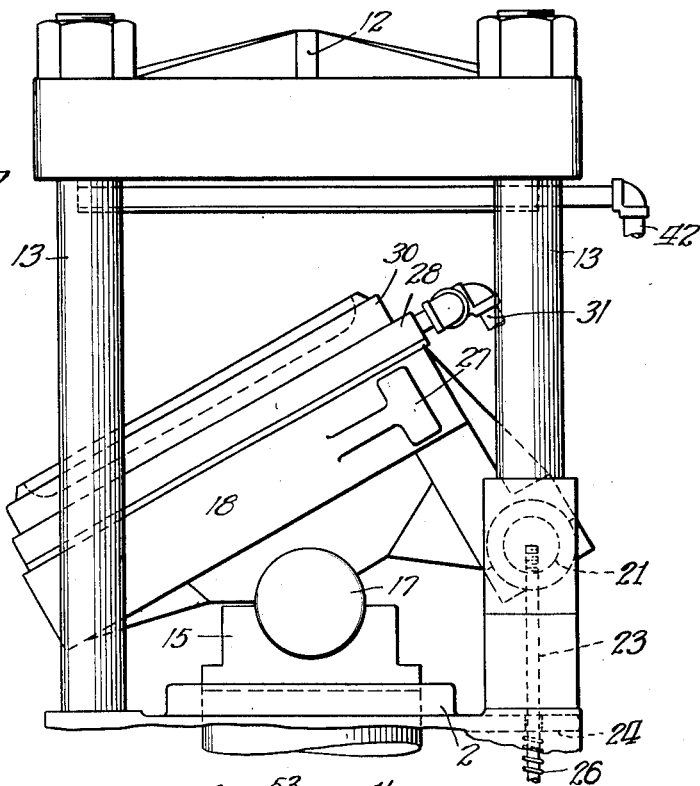
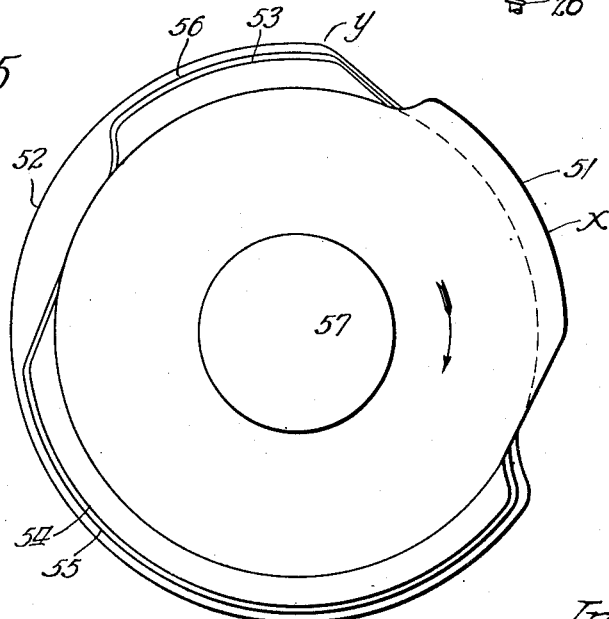

Patented Aug. 21, 1934

1,970,685

UNITED STATES PATENT OFFICE 1,970,685

VALVE CONTROL FOR PRESSES

Joseph W. Bishop, Muskegon Heights, Mich., assignor to The Brunswick-Balke-Collender Company, Chicago, Ill., a corporation of Delaware Original application January 27, 1928, Serial No. 249,842. Divided and this application October 8, 1931, Serial No. 567,750

1 Claim. (Cl. 257—3)

This invention relates to presses and particularly to presses for vulcanizing rubber or the like.

One of the principal objects of this invention is to provide a press wherein vulcanized rubber objects of various kinds can be simply and economically manufactured, with a minimum of attention on the part of the operator of the press, while at the same time a satisfactory product results.

This application is a division of application Serial No. 249,842, filed January 27, 1928, originally entitled Vulcanizing press and which is now designated Improvement in clutches, which application has now matured into Patent Number 1,870,226, dated August 9, 1932.

One object of my invention is to provide devices for controlling the several operations in a vulcanizing press on the simple manual actuation of a single control member.

Another object of my invention is to provide a vulcanizing press in which a manually actuated device controls power means for actuating valves and thereby at proper times producing hydraulic pressure, admitting steam to a heating and cooling chamber and admitting water to the heating and cooling chamber.

Other objects and advantages will appear as the description proceeds.

Referring to the accompanying drawings:

Figure 1 is a rear elevational view of a press embodying my invention.

Figure 2 is a side elevational view, parts being shown broken away and parts in section of the same.

Figure 3 is a perspective view of a toilet seat as made in the press.

Figure 4 is an elevational view, with parts broken away, of the upper portion of the press, showing the platen in tilted position.

Figure 5 is a diagrammatic view of the cams which actuate the valves.

Figure 6 is a plan view of valve casings and devices for actuating the valves, parts being broken away.

Figure 7 is a diagrammatic view of conduits and valves for controlling the application and the release of hydraulic pressure.

Figure 8 is a diagrammatic view of conduits and valves for controlling the admission of steam and water to the heating and cooling chamber.

Figure 9 is a diagrammatic view of conduits and valves for controlling the discharge of water or steam from the heating and cooling chamber.

Figure 10 is a detail sectional view through a valve casing, showing the valves for controlling the discharge of water and steam.

Figure 11 is a view, partly in section, of devices for controlling the movement of one of the cam shafts.

As shown in the drawings:

A bed 1 (Figures 1 and 2) supports a cylinder 2, with the interior of which a pipe 3 communicates, extending to a valve casing 4. The valve casing has therein a valve 5 which controls the discharge of water from the cylinder to an exhaust pipe 6 which empties into a trap 7. The valve casing also has an inlet valve 8 (Figure 7) which controls the flow of water to the cylinder from the pipe 10 which communicates with a hydraulic main 11 (Figures 1 and 2).

The cylinder 2 supports a cross-head 12 by means of columns 13 and receives a piston 14 which carries a block 15.

The piston has a horizontal guide or key 16 thereon which permits forward and rearward movement of the block 15 but prevents its being displaced laterally. A fulcrum member 17 is mounted on the block and supports a platen 18, the lower portion of the platen having a bearing portion shaped to lie on the surface of the fulcrum member and movable about the fulcrum member in the upward and downward movement of the piston. The platen has downward and rearward extensions 20 each pivotally mounted on a cross bar 21 which is secured at its ends to a pair of sleeves 22, which sleeves are slidable on the rear columns 13.

A rod 23 is secured to the cross bar 21 (Figures 2 and 4) and extends through an opening in a flange 24 on the cylinder and has a nut 25 on its lower end, between which and the flange a spring 26 is compressed. The spring tends to prevent the cross bar 21 from rising when the platen is in the open position shown in Figure 4 and retains the cross bar in lowered position while the platen is rising until abutments 27 on the platen engage the rear columns 13, when a further upward movement of the platen causes a compression of the spring.

A steam chest 28 and a mold 30 are secured to the platen, the former underlying the latter, and a flexible outlet tube 31 communicates with the interior of the steam chest and extends to a valve casing 32 (Figures 1, 6, 9, and 10).

The valve casing 32 encloses a valve 33 which controls the discharge of water through a pipe 34, and a valve 35 within the valve casing 32 controls the discharge of steam through a pipe 36.

Another flexible tube 37 (Figures 1 and 2) connects the steam chest 28 to a pipe 38 which is secured to an upper steam chest 40, mounted on the underside of the cross-head 12. A mold 41 is mounted below the steam chest 40.

An inlet pipe 42 communicates with the steam chest 40 and extends to a valve casing 43 (Figures 1, 2, 6 and 8) having valves 44 and 45 therein which control the admission of steam and water, respectively, to the pipe 42 from pipes 44' and 45' respectively.

Each of the valves 5, 8, 44, 45, 33 and 35 (Figures 7, 8 and 9) is provided with its respective stem 46 which is urged downwardly by a spring 47 and the valve stems engage respective rocker arms 48 pivoted on a support 49 (Figures 1 and 2). Each of the rocker arms is provided with a roller 50 which engages one of a series of cams 51, 52, 53, 54, 55 and 56 (Figures 1 and 5), corresponding to the valves 5, 8, 44, 45, 33 and 35, respectively. The cams are mounted on a common shaft 57 which is journaled in the support 49 and have the angular relationship relative to each other indicated in Figure 5.

The shaft 57, having the various valve actuating cams thereon, is operatively connected to any convenient source of power, such as a drive shaft 93, by means of a single revolution clutch, the construction and operation of which clutch is illustrated in the original application of which this case is a division.

The upper end of the rod 73 is pivotally connected to a link 78 (Figures 1 and 2) on a manual control member 79 which is rotatably mounted on the head 12 and is bent at its end 80 to facilitate its movement by an operator. A torsion spring 81 (Figure 2) engages the crosshead at one end and is secured at the other to the manual control member for normally maintaining it in such position that the rod 73 is in the lowered position indicated in Figure 2.

The press is used for vulcanizing articles made partially or entirely of rubber and is especially applicable to the manufacture of toilet seats. In the manufacture of this article, a coating of uncured rubber is applied to a wooden core and is given the shape of a toilet seat. This preshaped seat is then placed in the mold 30 when it is in the position shown in Figure 4. At this time all of the valves which have been described are in lowered position, excepting the hydraulic release valve 5, and the shaft 57 is in such a position that the point marked X on cam 51 for the valve 5 is in the uppermost position.

As is apparent from Figure 5, the movement of the shaft 57 and the cams thereon first permits the hydraulic release valve 5 to lower into closed position. Immediately thereafter at the point indicated at Y in Figure 5, the cams 52, 53 and 56 move the valves 8, 44 and 35 into open position.

The opening of the valve 8 permits the application of hydraulic pressure through the pipe 3 and the cylinder 2 to the piston 14 which raises the block 15 and causes the platen 18 to rise from the tilted position shown in Figure 4 until the abutments 27 engage the rear columns 13. In the movement of the platen 18 to the latter position, the slide 15 travels forwardly a short distance. After the abutments 27 engage the columns 13 the platen 18 ceases to tilt but slides directly upward to the position shown in Figure 2.

The opening of the steam inlet valve 44 and the steam outlet valve 35, which, as described, occurs when the hydraulic inlet valve 8 is opened, permits steam to circulate through the pipe 42, the steam chest 40, the flexible tube 37, the steam chest 20 and the flexible tube 31, and permits the steam to be discharged past the valve 35.

The toilet seat or other article within the press is held under pressure for a desired period of time, while it is subjected to the heat of the steam, and after a period in which a cure will have been effected the operator again actuates the manual control member 80 which operates in the manner described to again engage the clutch and again effects the rotation of the shaft 57. The cams 53 and 56 then permit the steam inlet valve and the steam outlet valve, respectively, to move to closed position, thus cutting off the flow of steam to the steam chests. Shortly thereafter the cams 54 and 55 move the valves 45 and 33 to open position and permit water to circulate through the steam chests. After this operation, the succeeding cam 62 disengages the clutch, thus stopping the movement of the shaft 57 as described.

The circulation of the water through the steam chests cools the molds and prepares the seat for ready removal when the press is open.

After the molds have been cooled sufficiently, the operator actuates the manual control member 80 and in the manner described again effects a rotation of the shaft 57. Thereafter the cams 54 and 55 permit the valves 45 and 33, respectively, to move to closed position, discontinuing the flow of water, and shortly thereafter the cam 51 actuates the hydraulic exhaust valve 5 and permits the release of the hydraulic pressure and the movement of the platen to the lowered position shown in Figure 4.

As has been described, the several operations in the vulcanizing press are controlled by the simple manual actuation of a single control member which controls the application of power to the valves and thereby renders them effective or ineffective, as desired.

In the event that through a mistake the operator should keep the shaft 57 in operative engagement with the source of power, the clutch, on account of its single revolution feature will become automatically disengaged, thereby stopping the operation of the machine until such time as the completed seat or other device has been removed from the molds.

My invention is not limited to the specific details of the modification shown and described, but divers alterations are contemplated within the spirit of the invention, and a substantial range of equivalents is contemplated within the scope of the appended claim.

What I claim and desire to secure by Letters Patent is—

A valve control for a heating and cooling chamber, comprising an inlet conduit communicating with said chamber, means for admitting steam to said conduit including a control valve, means for admitting water to said conduit including a water control valve, an outlet conduit leading from said chamber, means for conducting steam from said outlet conduit including a steam outlet valve, means for conducting water from said outlet conduit including a water outlet valve and means operable to simultaneously open said steam inlet valve and said steam outlet valve, and close said water inlet valve and said water outlet valve, the last mentioned means being also actuable to simultaneously open said water inlet valve and said water outlet valve and close said steam inlet valve and said steam outlet valve, and a single initially operating manual control for all of said means, together with automatic means for discontinuing the action of said manual control when the operation is completed.

JOSEPH W. BISHOP.